UNITED STATES PATENT OFFICE.

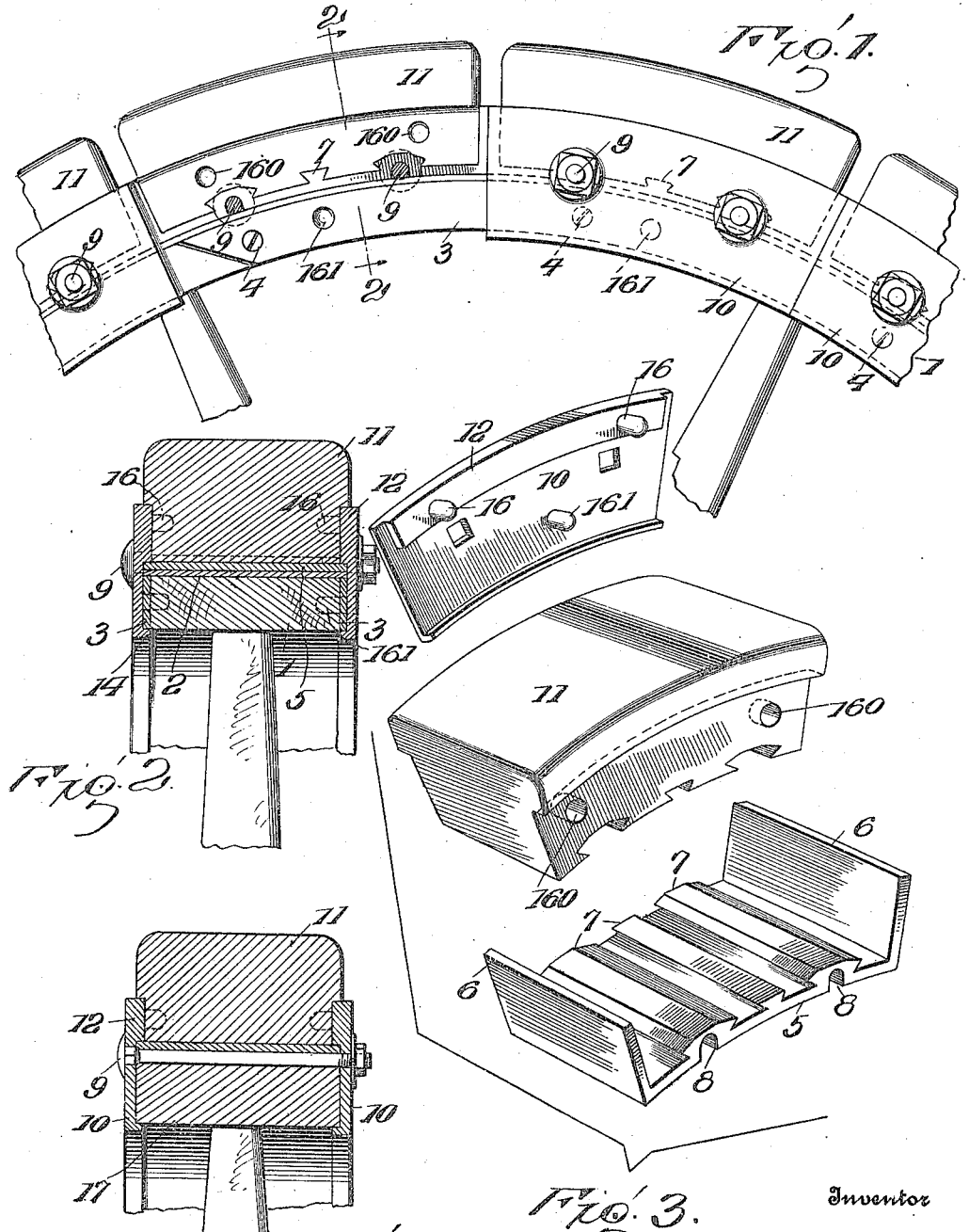

CHARLES F. LIGHTHOUSE, OF NEW YORK, N. Y., ASSIGNOR TO LIGHTHOUSE TIRE COMPANY, OF GUTTENBERG, NEW JERSEY, A CORPORATION OF DELAWARE.

SECTIONAL TIRE.

1,169,746.   Specification of Letters Patent.   Patented Jan. 25, 1916.

Application filed August 21, 1914, Serial No. 857,836. Renewed December 17, 1915. Serial No. 67,489.

*To all whom it may concern:*

Be it known that I, CHARLES F. LIGHTHOUSE, a resident of New York, State of New York, have invented certain new and useful Improvements in Sectional Tires; and I do hereby declare the following to be a full, clear, and exact description of the invention, such as will enable others skilled in the art to which it pertains to make and use the same.

This invention relates to sectional tires for truck or other wheels.

The object of the invention is to provide an economical, simple and efficient construction, and the invention consists in the devices and combinations hereinafter described and particularly pointed out in the claims.

In the accompanying drawings which illustrate the invention and form part of the specification: Figure 1 is a side elevation of a portion of a wheel, with one side plate removed; Fig. 2 is a transverse sectional view on line 2—2 of Fig. 1. Fig. 3 is a perspective view showing the parts of a section of the tire separate from each other and from the wheel; Fig. 4 is a view similar to Fig. 2 but showing the tire applied to a different kind of wheel.

The invention is herein described (1) in connection with a wheel having a wooden rim or felly, and (2) in connection with a wheel having a metal rim.

Referring to the drawing, numeral 1 denotes a wheel felly or rim of wood on the periphery of which is secured a metal band 2, the edges of which project beyond the wooden rim or felly. On opposite edges of the wooden rim and under the edges of the band, are secured metal rings 3, by screws 4.

Each section of the tire (of which there are preferably eight to complete a tire) comprises a curved metal base plate 5, having radial end flanges 6, and intermediate dovetail or overhanging transverse ribs 7. A plurality of these ribs have open grooves 8 on the concave side of the plate to receive cross bolts 9, which hold the opposite sectional side plates 10 of the block holder against the corresponding wheel felly or rim, the plate 5 and the rubber block or section 11. The plates 10 correspond in length to the base plate 5. The rubber tread block is preferably molded onto the holder plate whereby it is shaped and caused to engage the cross ribs 7, and is then vulcanized and thereby permanently connected rigidly to the plate. The part of the blocks between the end flanges 6 is a little narrower than the base plate, and into the spaces thus left fit the projecting parts 12 of the side plates 10 of the holder. Said side plates have also inner flanges 14 to extend under the side rings 3 on opposite sides of the wheel. This engagement locks the holder and block in place when the side plates are held by the bolts 9. The bolt holes through one ring 3 or of one side plate 10 are square to prevent the bolts from turning. The bolts do not pass through the rubber block, but through the open grooves 8, and across the outer surface of the wheel rim. To readily locate the side plates and to strengthen the hold on the rubber block, a plurality of posts or studs 16 are formed on the inner faces of the side plates. Some of the studs engage holes 160 in the block and others engage holes 161 in the side-rings 3, and may extend into the wood of the felly or rim. These studs may be omitted without departing from the invention.

The iron wheel rim 17 does not have a metal band such as band 2 above described, nor side rings 3, and the flanges 14 of the side plates extend directly under the iron wheel-rim. The side plates of the holder in this case will preferably not have studs to engage the edge of the rim. In other particulars the construction is as above described.

What I claim and desire to secure by Letters Patent of the United States is:

1. A sectional tire section comprising a base plate having outwardly extending radial end flanges and open sides, and between said flanges transverse dove-tail ribs, a tread block between such end flanges and narrower than the base plate, the block engaging said ribs and vulcanized to the base plate, opposite sectional side plates extending below the base plate and having inward wheel engaging flanges at their inner edges, and similar flanges at their outer edges fitting over the edges of the base plate, and bolts connecting the side plates.

2. The combination with a wheel rim, of sectional tire sections, each section comprising a base plate having outer radial end flanges, intermediate ribs, there being bolt grooves open throughout their length in the ribs, opposite sectional side plates having wheel-rim engaging flanges and base plate engaging flanges, and bolts occupying said open grooves and connecting the side plates.

3. In combination, a wheel rim comprising metal rings on its opposite edges, sectional tire sections each section having a tread block, and a holder therefor consisting of a base plate with outer radial end flanges and open sides, and opposite sectional side plates engaging said rings and said block and holder, and bolts between the wheel rim and said base plates and between and connecting said side plates.

In testimony whereof, I have signed this specification in the presence of two subscribing witnesses.

CHARLES F. LIGHTHOUSE.

Witnesses:
MELTON H. SHERWOOD,
JAMES V. BROWNE.

Copies of this patent may be obtained for five cents each, by addressing the "Commissioner of Patents, Washington, D. C."